United States Patent
Moe et al.

(10) Patent No.: US 8,109,069 B2
(45) Date of Patent: Feb. 7, 2012

(54) PROPORTIONAL COUNTERBALANCE SYSTEM FOR MOWER CUTTING UNITS

(75) Inventors: Chad L. Moe, Burnsville, MN (US); Jeffrey T. Drake, Richfield, MN (US)

(73) Assignee: The Toro Company, Bloomington, MN (US)

( * ) Notice: Subject to any disclaimer, the term of this patent is extended or adjusted under 35 U.S.C. 154(b) by 122 days.

(21) Appl. No.: 12/432,963

(22) Filed: Apr. 30, 2009

(65) Prior Publication Data

US 2010/0275565 A1 Nov. 4, 2010

(51) Int. Cl.
 *A01D 34/00* (2006.01)
(52) U.S. Cl. .............................................. 56/15.8; 56/7
(58) Field of Classification Search .................... 56/6, 7, 56/10.2 R, 10.2 E, 11.9, 15.8, 228, DIG. 11; 172/2, 3, 7; 37/415, 416; 460/6
See application file for complete search history.

(56) References Cited

U.S. PATENT DOCUMENTS

| | | | |
|---|---|---|---|
| 4,503,916 A * | 3/1985 | Wiegardt | 172/3 |
| 4,747,257 A * | 5/1988 | Hutchison | 56/15.8 |
| 4,864,805 A | 9/1989 | Hager et al. | |
| 5,297,378 A | 3/1994 | Smith | |
| 5,528,888 A * | 6/1996 | Miyamoto et al. | 56/10.2 F |
| 5,784,867 A | 7/1998 | McFarland et al. | |
| 5,995,895 A * | 11/1999 | Watt et al. | 701/50 |
| 7,051,498 B2 | 5/2006 | Modzik et al. | |
| 2008/0127619 A1 | 6/2008 | Link | |

* cited by examiner

*Primary Examiner* — Alicia Torres
(74) *Attorney, Agent, or Firm* — James W. Miller

(57) ABSTRACT

A proportional counterbalance system comprises an electronic controller operatively connected to a proportional hydraulic control valve to substantially continuously and infinitely adjust the backpressure in a fluid return circuit from the lift and lower cylinders of a plurality of cutting units on a mower. The backpressure is infinitely adjusted within a band between a minimum and a maximum backpressure in concert with a varying input parameter to the controller to transfer desired amounts of weight of the cutting units from the ground to the traction vehicle of the mower to enhance traction as needed. A wide variety of input parameters can be used, including a selected operating condition of the mower, a selected environmental condition of the turf surface being mowed, the actual, real time location of the mower on the turf surface, altitude above sea level, and manual input from the operator.

20 Claims, 5 Drawing Sheets

PROPORTIONAL COUNTERBALANCE SYSTEM FOR MOWER CUTTING UNITS

TECHNICAL FIELD

This invention relates to a mower comprising a self propelled traction vehicle that carries and thereby propels at least one grass cutting unit. More particularly, this invention relates to such a mower in which the cutting units carried on the traction vehicle have their weight at least partially borne by the ground during mowing.

BACKGROUND OF THE INVENTION

Certain well known mowers have one or more grass cutting units operatively connected to a traction vehicle such that the motion of the traction vehicle propels the cutting units over the ground to cut grass. The cutting units can comprise reel cutting units with each cutting unit having a reel that rotates about a horizontal axis to sweep the grass against a sharpened bedknife to cut the grass by severing the grass between the reel and the bedknife. Alternatively, the cutting units can comprise rotary cutting decks with each cutting unit having a blade that rotates about a vertical axis to cut the grass by impact of the sharpened cutting edges of the blade with the grass. When the mower carries a plurality of cutting units, the cutting units are usually spaced and staggered relative to one another in some fashion to collectively cut a swath of grass that is wider than the width of any individual cutting unit. Such a mower is often referred to as a gang mower. The Toro Groundsmaster 4500-D is an example of a gang mower that carries a plurality of rotary cutting decks.

The cutting units of such a mower are connected to the traction vehicle by lift arms that are moved by hydraulic cylinders to lift the cutting units off the ground to place them into a transport position or to lower the cutting units into engagement with the ground to place them into a mowing position. When the cutting units are so lowered into engagement with the ground, each cutting unit is substantially self supporting on the ground and rolls over the ground by virtue of various rotatable members, such as rollers, that are carried on each cutting unit and that engage the ground. The cutting units, the lift arms, and the various connections therebetween and with the traction vehicle are designed to allow each cutting unit to pivot with various degrees of freedom to allow each cutting unit to pitch, and/or roll, and/or yaw to conform itself to the contours of the ground in a free floating manner. When the cutting units are down in the mowing position and in this free floating cutting mode, the hydraulic cylinders that act on the lift arms of the cutting units are also typically in a float mode where the piston rod is free to move back and forth within each cylinder. This same result can also be achieved using a locked cylinder position and a lost motion slot in the lift arm.

It has long been known in the mower art that such self supporting, rolling cutting units transfer most of their weight directly to the ground when the cutting units are down and in their mowing position. It has also long been known in the mower art that this can adversely affect the traction of the traction vehicle. It has further been known that there are times when it would be desirable to transfer at least a portion of the weight of the cutting units back to the traction vehicle to put more downforce on the wheels of the traction vehicle and thereby increase the driving effectiveness or traction of the wheels. This weight transfer has often been accomplished in the mower art by some type of counterbalance system that tends to reduce how much of the cutting units weight is supported by the ground. This effectively puts more of the weight of the cutting units on the traction vehicle and less of their weight on the ground, though the weight transfer is never so great as to lift the cutting units completely off the ground since the cutting units must maintain contact with the ground in the mowing position.

One type of known prior art counterbalance system is shown in U.S. Pat. No. 4,864,805 to Hager et al., assigned to The Toro Company, the assignee of this invention. In Hager, the counterbalance system establishes one of two selected backpressures in the hydraulic fluid return circuit from lift and lower cylinders 14, namely either a 400 psi backpressure or a 600 psi backpressure as determined by which one of two different pressure relief valves is effective at a particular time. Either backpressure tends to bias the cutting units upwardly to transfer some of the weight of the cutting unit back to the traction vehicle, but the 400 psi backpressure will transfer less weight back to the traction vehicle than will the 600 psi backpressure. Thus, in the counterbalance system shown in Hager, the 400 psi backpressure is the normal or default backpressure that is present in the hydraulic fluid return circuit and thus at least some of the weight of the cutting units is always being transferred back to the traction vehicle.

As the mower shown in Hager is being operated, there will be times with the pressure in the hydraulic drive circuit to the hydraulic drive motors for the drive wheels will increase, e.g. when the traction vehicle is climbing a hill and the traction demands on the vehicle increase. A pilot line ports the hydraulic pressure in the drive motor circuit to a pilot operated hydraulic directional valve that in one position selects the 400 psi pressure relief valve and in the other position selects the 600 psi pressure relief valve. When the hydraulic pressure in the drive motor circuit increases enough, the on-off hydraulic valve shifts over and selects the 600 psi backpressure for use, thus transferring more weight from the cutting units to the traction vehicle in an attempt to maintain traction.

While the Hager counterbalance system is effective, it provides only two preselected values for the backpressure, namely either 400 psi or 600 psi. In certain commercial embodiments of the Hager counterbalance system, the two preselected values for the backpressure were closer together, namely 620 psi and 700 psi than the values described in the Hager patent. However, in either case, when the higher backpressure was suddenly applied instead of the lower backpressure, the abrupt nature of the shift in traction on the traction vehicle could often be felt or sensed by the operator on the traction vehicle. Such an abrupt traction shift could potentially be distracting or alarming to the operator, particularly to an unskilled operator, and thus represented a disadvantage of the prior art system. In addition, if the traction vehicle lost traction before the counterbalance system applied the higher backpressure, the counterbalance system was not designed to allow the traction vehicle to regain traction once traction was lost.

SUMMARY OF THE INVENTION

One aspect of this invention relates to a mower for cutting grass growing on a turf surface comprises a traction vehicle supported for rolling over the ground by a plurality of wheels. At least some of the wheels are powered by a traction drive system to propel the traction vehicle over the ground. A grass cutting unit is operatively connected to the traction vehicle. The grass cutting unit is supported in a mowing position such that at least some of the weight of the grass cutting unit is directly borne by the ground when the cutting unit is in the mowing position. A hydraulic cylinder is coupled to the cutting unit to lift the cutting unit out of engagement with the ground to place the cutting unit into a raised transport position out of engagement with the ground and to lower the cutting unit into engagement with the ground to place the cutting unit into the mowing position. A lift and lower hydraulic circuit is provided for the cylinder with the hydraulic circuit having a fluid supply circuit to the cylinder and a fluid return circuit from the cylinder. A counterbalance system is provided that is effective to shift desired amounts of the weight of the cutting unit between the ground and the traction vehicle. The counterbalance system comprises a proportional hydraulic valve positioned in the return circuit to generate a backpressure in the return circuit that counterbalances at least a portion of the weight of the cutting unit on the ground by shifting the portion of weight to the traction vehicle. The counterbalance system also includes an electronic controller operatively connected to the proportional valve with the controller being responsive to a variable input parameter for substantially continuously and infinitely varying the backpressure being provided in the return circuit in concert with variation in the input parameter.

Another aspect of this invention relates to a mower for cutting grass growing on a turf surface comprises a traction vehicle supported for rolling over the ground by a plurality of wheels. At least some of the wheels are powered by a traction drive system to propel the traction vehicle over the ground. A grass cutting unit is operatively connected to the traction vehicle. The grass cutting unit is supported in a mowing position such that at least some of the weight of the grass cutting unit is directly borne by the ground when the cutting unit is in the mowing position. A counterbalance system is provided that is effective to proportionally shift desired amounts of the weight of the cutting unit between the ground and the traction vehicle. The counterbalance system comprises a proportionally adjustable weight transfer mechanism that counterbalances at least a portion of the weight of the cutting unit on the ground by shifting varying portions of the weight to the traction vehicle in a substantially infinite adjustment manner. The counterbalance system further comprises an electronic controller operatively connected to the weight transfer mechanism with the controller being responsive to a variable input parameter for substantially continuously and infinitely adjusting the weight transfer mechanism in concert with variation in the input parameter.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
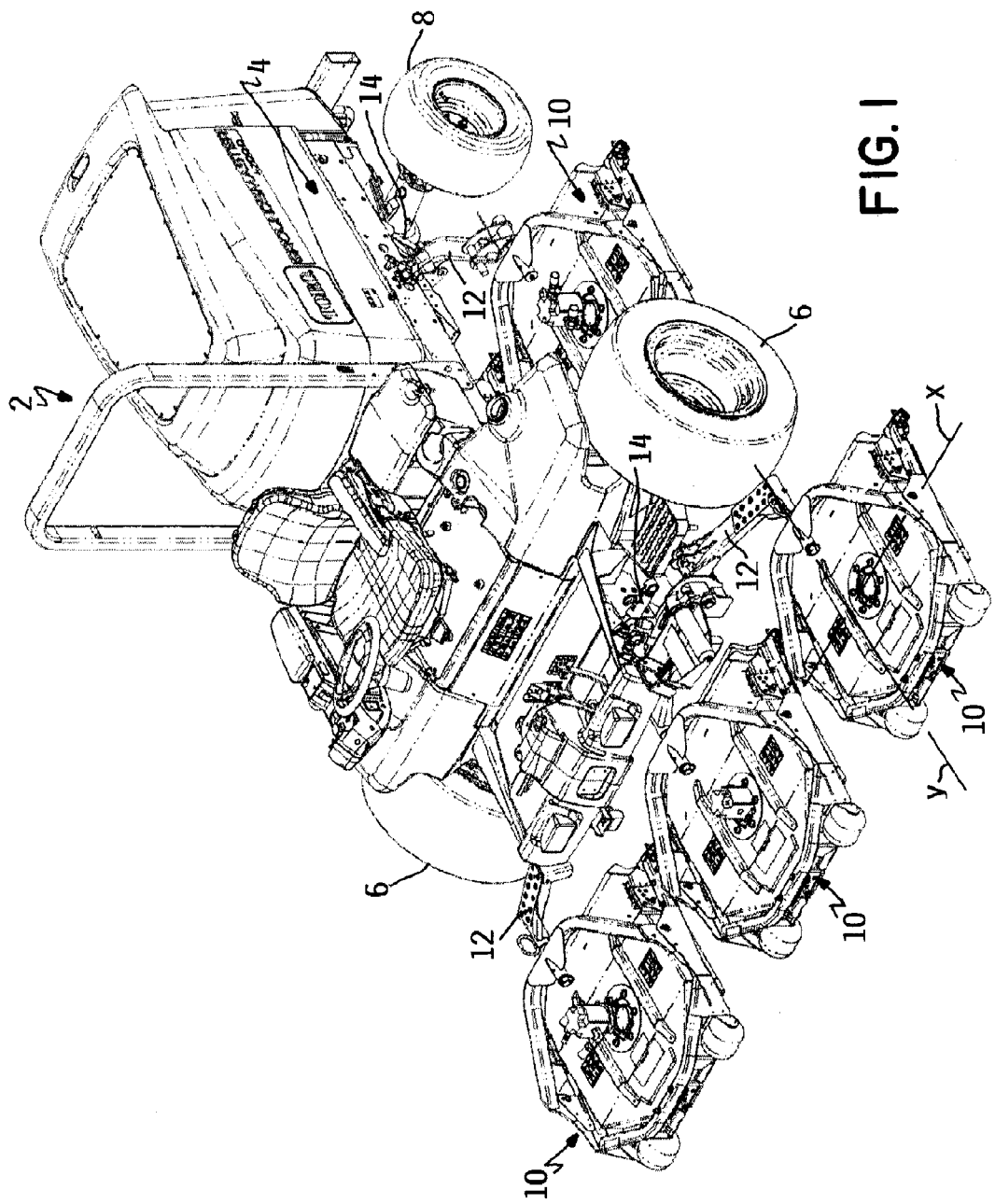
FIG. 1 is a perspective view of one embodiment of a mower of the type with which the proportional counterbalance system of this invention may be used.

FIG. 1 is a view of one mower 2 with which the proportional counterbalance system of this invention may be used. Mower 2 depicted in FIG. 1 is a Toro Groundsmaster 4500-D, manufactured and sold by The Toro Company, the assignee of this invention. Mower 2 comprises a traction vehicle 4 having a pair of front drive wheels 6 and a pair of rear wheels 8. Rear wheels 8 may be driven in a 4WD drive mode but are not driven in a 2WD drive mode. Traction vehicle 4 carries five cutting units 10 in a 3-2 gang configuration comprising a front row of three cutting units followed by a rear row of two cutting units (only one of which can be seen in FIG. 1) that cover the gaps between cutting units 10 in the front row.

Cutting units 10 comprise rotary cutting decks but reel cutting units could be used in place of the depicted rotary cutting decks. The number of cutting units 10 can also vary and be larger or smaller than the five cutting units shown and cutting units 10 can be arranged in different gang configurations. Each cutting unit 10 is operatively connected to traction vehicle 4 by a lift arm 12 with some of the lift arms being visible in FIG. 1. Each lift arm 12 is operatively connected to a lift and lower hydraulic cylinder 14.

When cutting units 10 are lowered into engagement with the ground in a mowing position, cutting units 10 are individually self-supporting for movement over the ground through the use of various rotatable ground engaging members, e.g. rollers 16, carried on the front and rear of cutting units 10. Cutting units 10 shown in FIG. 1 are provided with a floating motion in two degrees of freedom in the mowing position. In the mowing position, each cutting unit 10 is able to pitch about a transverse pitch axis x and to roll about a fore-and-aft roll axis y.

The traction drive to front drive wheels 6 in the 2WD or 4WD mode is by the use of a separate, individual hydraulic drive motor (not shown) connected to each front drive wheel that is supplied with pressurized hydraulic fluid from a common, variable displacement hydraulic traction pump (not shown) that is solely tasked for supplying the traction drive circuit of mower 2. If the 4WD mode is selected, a further hydraulic motor (not shown) that jointly powers both of the rear wheels 8 is also brought into the traction drive circuit of mower 2. The details of the traction drive circuit of mower 2 are not shown herein. Suffice it to say, however, that when a hydraulic traction drive circuit is provided for propelling at least some of the wheels of mower 2, as in the case of the depicted Toro Groundsmaster 4500-D, the pump that supplies such traction drive circuit and the traction drive circuit itself are separate and distinct from a second pump and the second hydraulic lift and lower circuit that powers lift and lower cylinders 14 that lift and lower cutting units 10. Thus, none of the hydraulic fluid or power being used in the traction drive circuit to propel traction vehicle 4 is being robbed from the purpose of driving traction vehicle 4 or is being diverted for the use of providing a backpressure in lift and lower cylinders 14.

Figure 2:
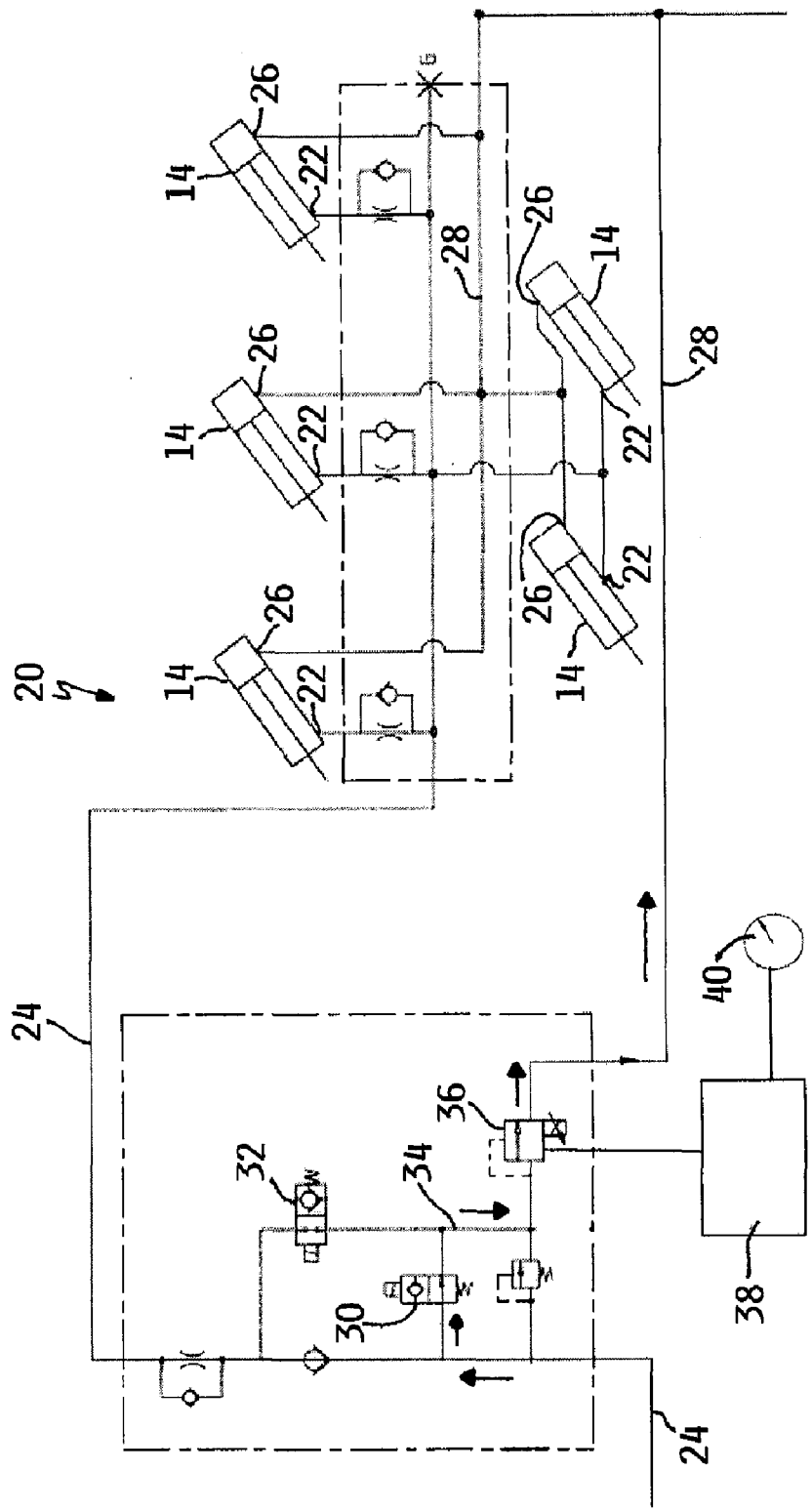
FIG. 2 is a combined partial electrical and hydraulic schematic of one embodiment of the proportional counterbalance system of this invention with the disclosed portion of the hydraulic schematic being shown in a float/lower configuration for the lift and lower cylinders such that the counterbalance system is effective either when the cutting units are being lowered from their transport position towards their mowing position or are in engagement with the ground in their mowing position.
Figure 3:
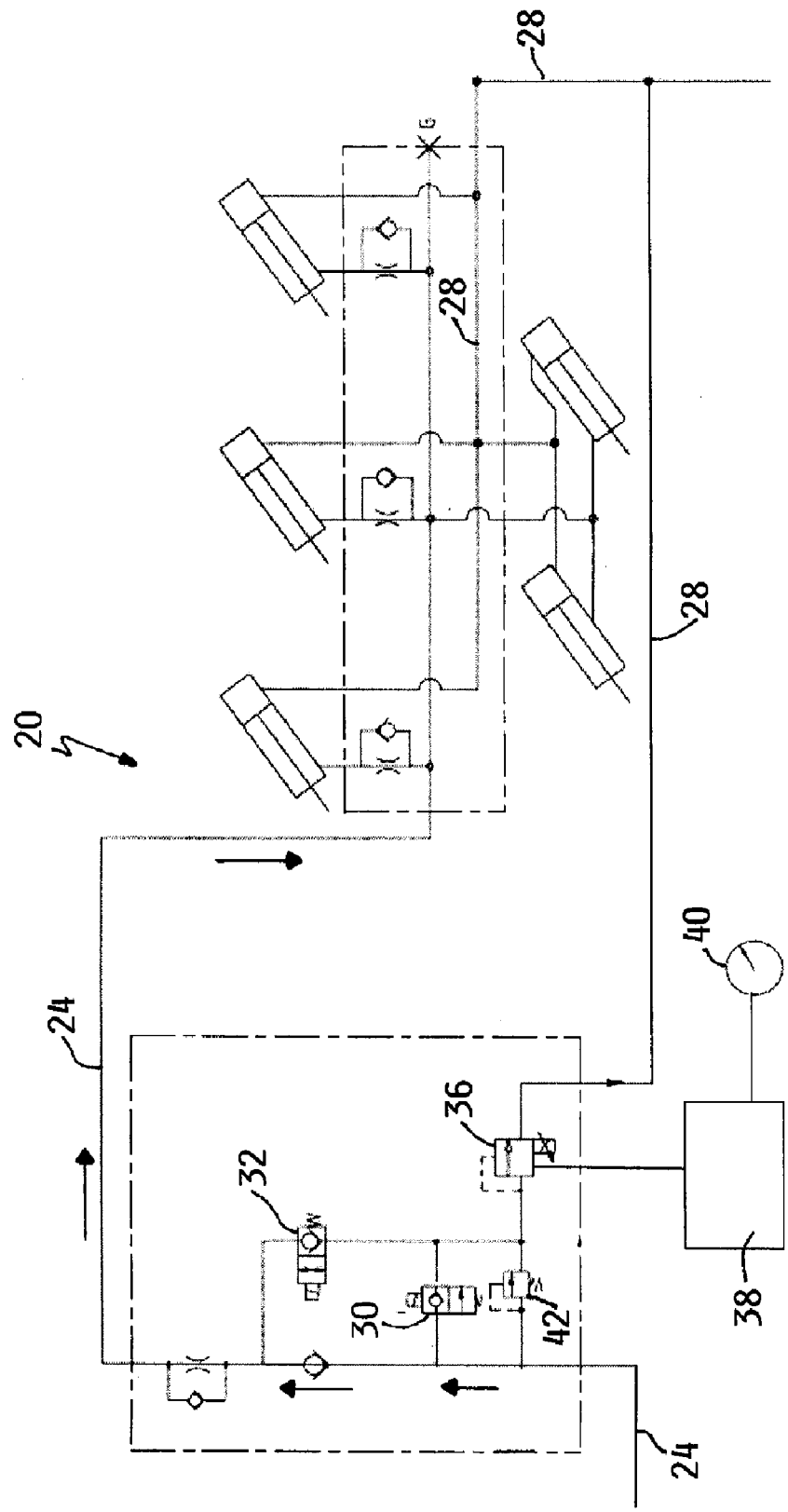
FIG. 3 is a partial schematic view similar to FIG. 2, but showing the disclosed portion of the hydraulic schematic in a lift configuration for the lift and lower cylinders such that the counterbalance system is ineffective when the cutting units are being raised into their transport position.

Turning now to FIGS. 2 and 3, an embodiment of the proportional counterbalance system of this invention is schematically depicted generally as 20. System 20 works in conjunction with the plurality of lift and lower hydraulic cylinders 14 for lifting and lowering cutting units 10 into and out of engagement with the ground. Preferably, there is one lift and lower cylinder 14 for each cutting unit 10 though a single lift and lower cylinder 14 could act on more than one cutting unit 10. In a hydraulic sense, lift and lower cylinders 14 are plumbed together with inlets 22 to all cylinders 14 being fed by hydraulic fluid supplied from a common fluid inlet circuit 24 and the outlets 26 of all cylinders 14 being connected to a common fluid return circuit 28. As noted earlier, the hydraulic fluid on inlet circuit 24 is supplied by a second hydraulic pump (not shown) that is separate and distinct from the hydraulic pump supplying pressurized hydraulic fluid to the traction drive circuit.

Referring first to FIG. 2, the incoming fluid on inlet circuit 24 normally passes through a lift valve 30 that is normally open when cutting units 10 are in engagement with the ground in their cutting positions or are being lowered towards the ground. In either of these cases, a float/lower valve 32 is disposed as shown in FIG. 2 to allow fluid supplied to inlets 22 of cylinders 14 to drain back out of cylinders 14 during cutting unit lowering, thereby permitting cutting units 10 to gravitationally lower from their raised transport positions to their cutting positions, or to pass back and forth into and out of cylinders 14 during floating of cutting units 10 in their cutting positions. In most cases, both lift valve 30 and float/lower valve 32 will be in their open positions depicted in FIG. 2. After first passing through the open lift valve 30, the hydraulic fluid being supplied along inlet circuit 24 will be fed via a line 34 to the inlet of a proportional hydraulic control valve 36. The outlet of proportional valve 36 is connected to return circuit 28 from cylinders 14. Proportional valve 36 is thus able to establish a desired backpressure in return circuit 28 from cylinders 14 as will be explained hereafter.

Proportional valve 36 is an electrically controlled hydraulic relief valve that includes an electric coil (not shown) to open and close valve 36. An electronic controller 38 is electrically connected to the coil of proportional valve 36 for infinitely opening and closing valve 36 by supplying a varying current to the coil. Controller 38 responds to the hydraulic pressure in the traction drive circuit as sensed by any suitable pressure sensor 40 that is operatively connected to the hydraulic traction drive circuit for sensing the pressure in that circuit. The pressure as sensed by sensor 40 is converted to an analog voltage which is provided to controller 38. Controller 38 then determines the appropriate current to apply to the coil of proportional valve 36 to continuously adjust the driving current of the coil, and thus the degree of the opening and closing of proportional valve 36, in accordance with variations in the traction drive pressure.

Figure 4:
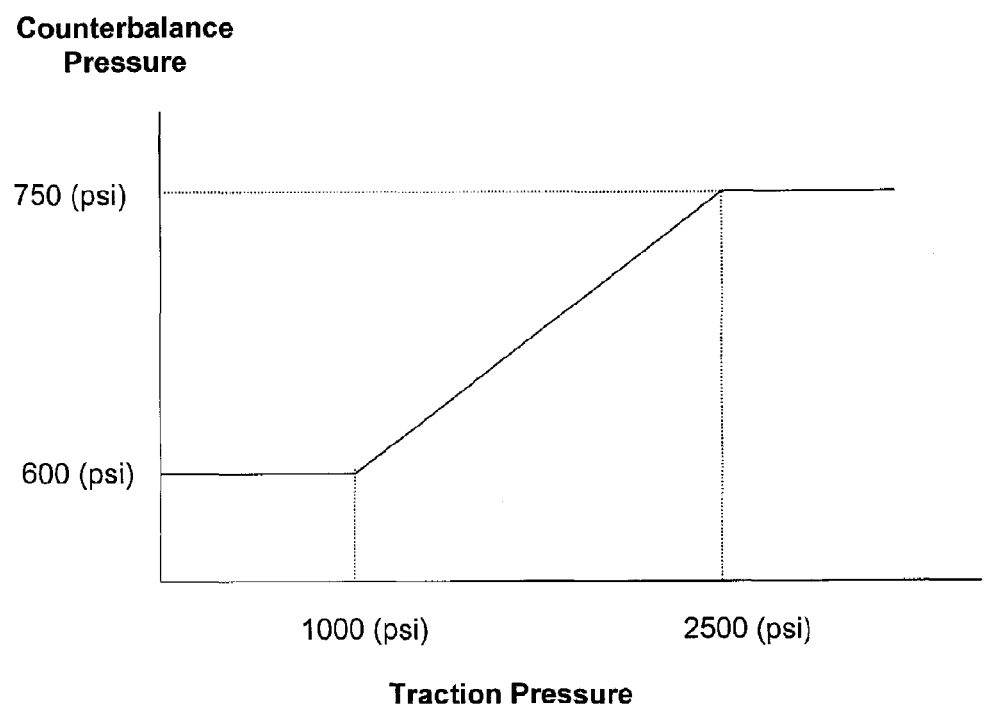
FIG. 4 is a pressure diagram of the operation of the counterbalance system of FIG. 2, particularly showing the selection of a variable backpressure between preselected minimum and maximum backpressures as a function of the pressure in the hydraulic drive motor circuit.

Referring to FIG. 4, proportional valve 36 is preferably infinitely controlled by controller 38 and sensor 40 in a band between a minimum setting of proportional valve 36 (i.e. 600 psi at 1000 psi in the traction drive circuit) and a maximum setting of proportional valve 36 (i.e. 750 psi at 2500 psi in the traction drive circuit). Thus, when the traction drive pressure is 1000 psi or less, proportional valve 36 establishes a constant backpressure of 600 psi in return circuit 28 from cylinders 14 to transfer a predetermined amount of weight from cutting units 10 to traction vehicle 4. At a traction drive pressure of 2500 psi or more, proportional valve 36 establishes a constant backpressure of 750 psi in return circuit 28 from cylinders 14 to transfer a higher amount of weight from cutting units 10 to traction vehicle 4. This aids in maintaining traction of traction vehicle 4. Between 1000 psi and 2500 psi of traction drive pressure, proportional valve 36 is opened by controller 38 proportionally with the increase in pressure, e.g. at 1750 psi traction drive pressure the proportional valve 36 would supply a backpressure of 675 psi to return circuit 28 from cylinders 14.

The proportional and infinite adjustment provided by proportional valve 36, at least infinite between the minimum and maximum settings of proportional valve 36, avoids the abrupt traction change provided when there are only the minimum and maximum settings. This is an advantage since the change in traction will be smooth and will not likely to be noticeable to the operator, thus enhancing comfort and safety. Moreover, the counterbalance being provided by proportional valve 36 is effective when cutting units 10 are in their mowing positions or are being lowered towards the ground (corresponding to the open position of float/lower valve 32 shown in FIG. 2). The application of a counterbalance pressure to cutting units 10 while cutting units 10 are lowering by draining the fluid from the active side of the pistons back through inlets 22 of cylinders 14 is desirable since it helps retard the lowering of cutting units 10 and prevents them from slamming down.

Referring now to FIG. 3, when it is desired to lift cutting units 10 from the ground to place them into their raised transport positions, all hydraulic fluid in the lift system is routed to the lift and lower cylinders 14 and is isolated from proportional valve 36. This lift function is implemented by shifting both lift valve 30 and float/lower valve 32 to their closed positions as shown in FIG. 3. In these positions of the valves, the hydraulic fluid on inlet circuit 24 is only applied to inlets 22 of lift and lower cylinders 14 to push against the pistons to cause lift and lower cylinders 14 to raise cutting units 10 up off the ground. The hydraulic fluid on inlet circuit 24 is isolated in this condition from proportional valve 36 and there will be no backpressure in return circuit 28 from cylinders 14.

To protect lift and lower cylinders 14 from an overpressure condition when cylinders 14 are being used to lift cutting units 10, such as if a piston should become jammed or cutting unit 10 is somehow prevented from lifting, a pressure relief valve 42 is set to vent at a relatively high pressure, e.g. 1600 psi. Relief valve 42 is used in inlet circuit 24 such that very high pressures can momentarily be vented to downstream through proportional valve 36. However, in most normal lift and lower operations where relief valve 42 remains closed, proportional valve 36 is simply ineffective in establishing a backpressure in return circuit 28 from cylinders 14, thus making the lift operation of cutting units 10 more hydraulically efficient.

When the cutting units are raised fully to their transport position, lift valve 30 is shifted to the open position and lower/float valve 32 is in the closed position, preventing the hydraulic fluid from draining from the active side of the lift and lower cylinders. When the cutting units are held in the transport position, there is no need for backpressure, so proportional valve 36 is set to the minimal pressure possible. This reduces heat generation in the hydraulic system during machine transport.

Figure 5:
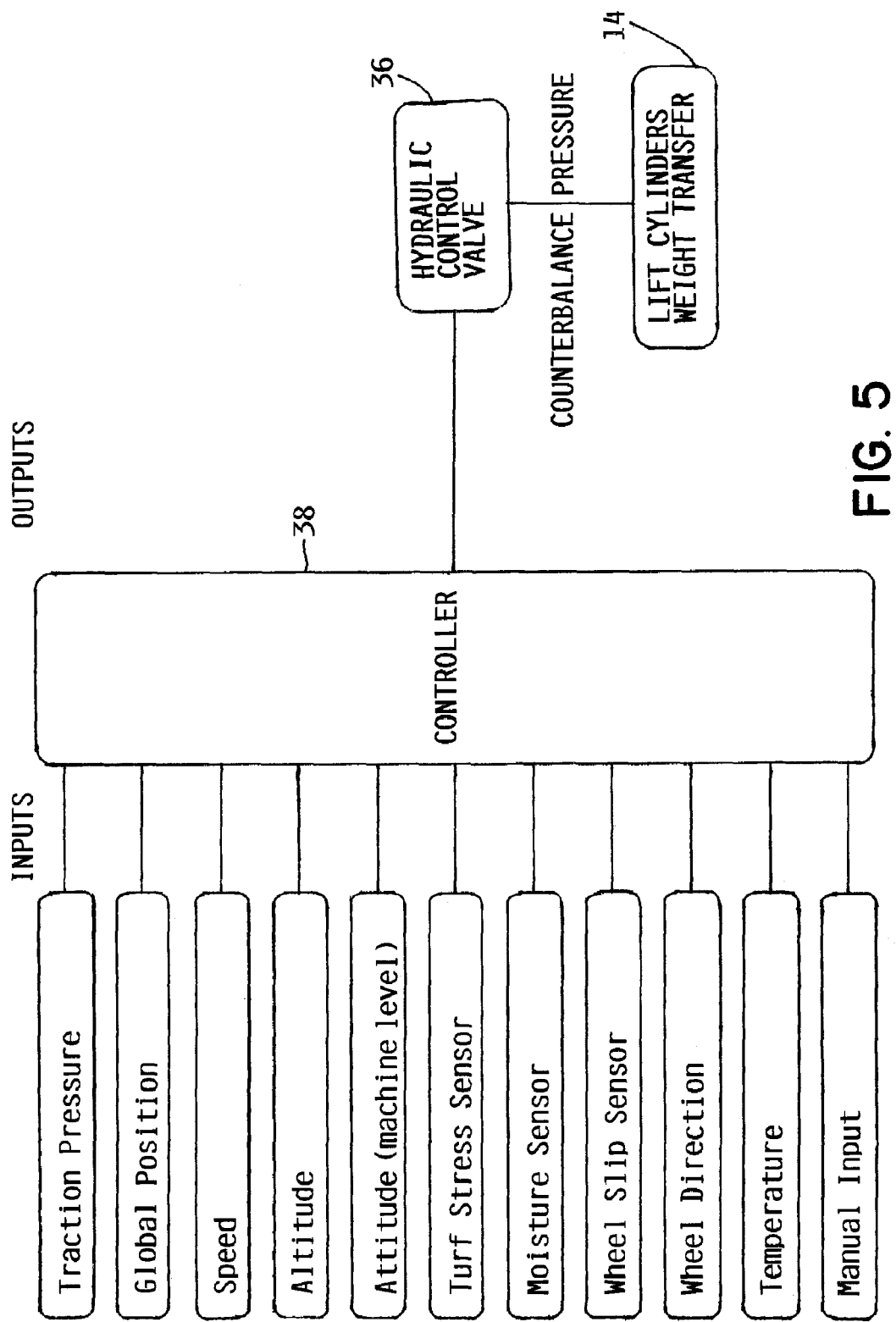
FIG. 5 is a block diagram showing the operation of the counterbalance system of FIG. 2, particularly showing an array of different inputs to the counterbalance system that may be used to control the operation of the counterbalance system.

Referring now to FIG. 5, the use of an electronic controller 38 acting on a proportional hydraulic control valve 36 to establish a proportionally variable backpressure in return circuit 28 of lift and lower cylinders 14 for cutting units on a mower allows for a wide variety of inputs to be used as the means for controlling proportional valve 36. In addition to directly measuring or sensing traction pressure as described above, some of these additional inputs could include, but are not limited to, the following inputs.

Global Position. With this input, the traction needs of traction vehicle 4 are mapped according to the location of traction vehicle 4 on a golf course or other turf area that is to be mowed, i.e. according to whether traction vehicle 4 will be on a flat surface such as a fairway, or in a tall grass area such as a rough, or on a hill, or on known wet or damaged locations. The traction needs of traction vehicle 4 will then be correlated to desired backpressures to be supplied by proportional valve 36, e.g. one backpressure value for use on flat surfaces, another backpressure value for use in roughs, a third backpressure value for use on some hills, a fourth backpressure value for use on other hills, a fifth backpressure value for use in a wet area, a sixth backpressure value for use in damaged areas, etc. This backpressure map will be stored in controller 38 and will be used in conjunction with a GPS location system on traction vehicle 4 to control proportional valve 36 as determined by the actual location of traction vehicle 4 on the golf course or other turf area.

Ground Speed. With this input, the traction needs of traction vehicle 4 are inferentially related to the ground speed of traction vehicle 4. At higher vehicle speeds during mowing, traction vehicle 4 is most likely operating in areas where traction is not a problem, and thus a lower counterbalance pressure will be required. If the ground speed drops off and decreases to a lower level during mowing, traction vehicle 4 may be experiencing difficulty in maintaining traction. Thus, proportional valve 36 can be infinitely controlled in concert with the actual vehicle speed to infinitely adjust the counterbalance pressure, with lower pressure relating to higher speed and vise versa.

Altitude Above Sea Level. At progressively higher altitudes above sea level, the engine becomes less efficient and it will in most cases lead to a progressive loss of traction for equal power settings. Thus, the backpressures normally provided by proportional valve 36 at sea level can be adjusted as the altitude above sea level changes with higher counterbalance pressures being provided at higher altitudes and lower counterbalance pressures at lower altitudes.

Using a combination of input parameters, such as altitude and GPS, the system can anticipate changing conditions and vary the counterbalance to better allow the cutting units to follow the turf terrain. An example of this would be when cresting a hill. In this situation, the front cutting units 10 may be at the top of the hill while the tractor is still climbing and trying to increase traction. In this instance, the front cutting units may not properly follow the changing terrain and the backpressure might desirably be reduced to put more weight on the cutting units. A similar but reverse situation can be envisioned when the traction vehicle drives into a hill with the front cutting units but the traction tires are still on level ground. In this case, the backpressure might desirably be increased to transfer cutting unit weight to the traction vehicle.

Attitude of Traction Vehicle 4 (to determine uphill, downhill, or flat mowing). A sensor can be placed on traction vehicle 4 to determine the attitude of traction vehicle 4 relative to a substantially horizontally level orientation. If the sensor determines that traction vehicle 4 is at an angle relative to horizontal as it climbs a hill, proportional valve 36 can be infinitely varied to increase the counterbalance pressure as the hill angle increases and to decrease the counterbalance pressure as the hill angle decreases. During a downhill descent, the counterbalance system could be utilized to provide increased vehicle stability outside of the normal operating range to prevent the traction vehicle from possibly becoming unsafe.

Turf Stress Sensing (to prevent turf damage). Various spectrometer type instruments, such as the GreenSeeker, are available which use reflected red and near infrared light to gauge the health of a turf surface. The readings from such instruments could be used to control proportional valve 36 with more backpressure being applied when the turf surface is deemed to be unhealthy, to thereby decrease the effective weight of cutting units 10 on the turf, than when the turf is deemed to be healthy. Again, this can be done in an infinite manner by varying the backpressure in conjunction with infinite readings of the turf health from the spectrometer.

Moisture Sensing (to prevent turf damage). Again, the readings of soil moisture sensors can be used to vary the counterbalance pressure in accordance with the soil moisture providing more backpressure over wet soil, i.e. to cause less weight of the cutting units 10 to be borne by the ground to decrease the tendency of the cutting units 10 to sink into or gouge the ground, and less backpressure over dry soil. Increased backpressure also has the advantage of reducing the tendency for wheel slip in wet areas.

Wheel Slip Sensors. With this input, a sensor is used with one or more of the powered drive wheels of traction vehicle 4 to directly detect wheel slippage and to measure the relative amount of such slippage in relation to a non-slip condition. Such information could then be used to infinitely and variably control the backpressure provided by proportional valve 36 to provide more or less backpressure depending upon whether the wheel is slipping more or less.

Wheel Direction Sensors. If sensors detect that the powered drive wheels are being driven in reverse, the backpressures supplied by proportional valve 36 can be applied according to a separate schedule appropriate for operation in reverse.

Hydraulic Fluid, Engine or Coolant Temperature. If a high temperature situation is detected indicating that traction vehicle 4 is operating under stress, proportional valve 36 can be adjusted to decrease the load on the engine. (It may be easier on the engine to operate with more weight off the cutting units than with all the weight on the ground). The temperature of the hydraulic fluid can also be monitored as an input and, as stated above, valve 36 can be adjusted to decrease the hydraulic load on the traction vehicle until a safe temperature condition has been reestablished.

Manual Input. This allows an operator to selectively dial in a desired backpressure, or to manually and infinitely vary the backpressure, or to turn off system 20 entirely in accordance with the operator's preferences and/or the operator's real time sense of the traction needs of traction vehicle 4.

Controller 38 could be set up to read as few as one of these inputs or as many inputs as are available to determine the optimal counterbalance setting. If controller 38 is simultaneously considering more than one input, controller 38 would have a prioritization schedule to determine the rank order of which inputs are more important and which are less important and how any conflicts in the relative actions recommended by the inputs should be resolved. In addition, if controller 38 accepts multiple inputs, then the operator could have a choice in being able to select which input or inputs controller 38 uses and which input or inputs controller 38 disregards. Some operators might prefer using only global positioning, other operators might prefer using a direct detection of wheel slippage, etc.

Various modifications of this invention will be apparent to those skilled in the art. For example, an electric rather than a hydraulic version of system 20 could be implemented with the electric system using a current draw rather than hydraulic pressure. Thus, the scope of the invention shall be limited only by the appended claims.

We claim:

1. A mower for cutting grass growing on a turf surface, which comprises:
   (a) a traction vehicle supported for rolling over the ground by a plurality of wheels, wherein at least some of the wheels are powered by a traction drive system to propel the traction vehicle over the ground;
   (b) a grass cutting unit operatively connected to the traction vehicle, wherein the grass cutting unit is supported in a mowing position such that at least some of the weight of the grass cutting unit is directly borne by the ground when the cutting unit is in the mowing position;
   (c) a hydraulic cylinder coupled to the cutting unit to lift the cutting unit out of engagement with the ground to place the cutting unit into a raised transport position out of engagement with the ground and to lower the cutting unit into engagement with the ground to place the cutting unit into the mowing position;
   (d) a lift and lower hydraulic circuit for the cylinder with the hydraulic circuit having a fluid supply circuit to the cylinder and a fluid return circuit from the cylinder;
   (e) a counterbalance system that is effective to shift desired amounts of the weight of the cutting unit between the ground and the traction vehicle, which comprises:
      (i) a single proportional hydraulic valve connected between the supply circuit and the return circuit to establish a variable backpressure in the return circuit that counterbalances at least a portion of the weight of the cutting unit on the ground by shifting the portion of weight from the ground to the traction vehicle; and
      (ii) an electronic controller operatively connected to the proportional valve with the controller being responsive to a variable input parameter for substantially continuously and infinitely varying the backpressure being provided in the return circuit in a band lying between a minimum backpressure and a maximum backpressure in concert with variation in the input parameter.

2. The mower of claim 1, wherein the traction drive system is a hydraulic traction drive system having a hydraulic traction drive circuit that experiences traction drive pressure that varies in accordance with the traction requirements of the traction vehicle with a higher traction drive pressure being present when higher traction requirements are present and a lower traction drive pressure being present when lower traction requirements are present, and wherein the variable input parameter to the controller is the traction drive pressure in the hydraulic traction drive circuit as measured by a pressure sensor.

3. The mower of claim 2, wherein the traction drive circuit is separate from the lift and lower circuit and each circuit is supplied with pressurized hydraulic fluid from its own individual pump.

4. The mower of claim 1, wherein the controller maintains the backpressure substantially constant at the minimum backpressure when the input parameter has a value that is at or less than a predetermined first value, wherein the controller maintains the backpressure substantially constant at the maximum backpressure when the input parameter has a value that is at or greater than a predetermined second value that is higher than the first value, and wherein the controller substantially continuously and infinitely varies the backpressure in the band lying between the minimum backpressure and the maximum backpressure as the input parameter changes between the first and second values thereof.

5. The mower of claim 1, wherein the lift and lower circuit is configured to turn the counterbalance system off when the cylinder is being used to lift the cutting unit into its transport position.

6. The mower of claim 5, wherein the lift and lower circuit is further configured to turn the counterbalance system on when the cylinder is being used to lower the cutting unit out of its transport position and when the cylinder is in the mowing position thereof.

7. The mower of claim 1, wherein a plurality of cutting units are carried on the traction vehicle and a plurality of cylinders are used to lift and lower the plurality of cutting units, and wherein the supply circuit to the cylinders is a common supply circuit and the return circuit from the cylinders is a common return circuit such that a single proportional valve is used to establish a common backpressure in the common return circuit that is effective on all the cylinders.

8. The mower of claim 1, wherein each cutting unit is lifted and lowered by a separate cylinder.

9. The mower of claim 1, wherein the input parameter is a parameter corresponding to a condition of the traction vehicle when the traction vehicle is operating.

10. The mower of claim 9, wherein the traction vehicle condition parameter is chosen from a group of parameters consisting of:
    (a) traction drive pressure in a hydraulic traction drive circuit that drives the powered wheels of the traction vehicle;
    (b) amount of slippage of at least one of the powered wheels of the traction vehicle;
    (c) speed of the traction vehicle;
    (d) temperature of an engine or an engine coolant of the traction vehicle;
    (e) attitude of the traction vehicle relative to a substantially horizontally level orientation; and
    (f) direction of rotation of the powered wheels of the traction vehicle.

11. The mower of claim 1, wherein the input parameter is a parameter corresponding to an environmental condition of the turf surface.

12. The mower of claim 11, wherein the turf surface environmental condition parameter is chosen from a group of parameters consisting of:
    (a) relative health of the turf surface as measured by a spectrometer; and
    (b) soil moisture content of the turf surface.

13. The mower of claim 1, further including a map correlating backpressure values to different geographical locations on the turf surface with the backpressure values being available to the controller during mowing, and wherein the input parameter is an actual, real time location of the traction vehicle on the turf surface.

14. The mower of claim 13, wherein the actual, real time location of the traction vehicle on the turf surface is supplied by a GPS device carried on the traction vehicle.

15. The mower of claim 1, wherein the input parameter is altitude of the traction vehicle above sea level.

16. The mower of claim 1, wherein the input parameter is a manual input from an operator of the traction vehicle which permits the operator to manually establish a backpressure.

17. The mower of claim 16, wherein the manual input allows the operator to turn off the counterbalance system.

18. A mower for cutting grass growing on a turf surface, which comprises:

(a) a traction vehicle supported for rolling over the ground by a plurality of wheels, wherein at least some of the wheels are powered by a traction drive system to propel the traction vehicle over the ground;

(b) a grass cutting unit operatively connected to the traction vehicle, wherein the grass cutting unit is supported in a mowing position such that at least some of the weight of the grass cutting unit is directly borne by the ground when the cutting unit is in the mowing position;

(c) a counterbalance system that is effective to proportionally shift desired amounts of the weight of the cutting unit between the ground and the traction vehicle, which comprises:

(i) a proportionally adjustable weight transfer mechanism that counterbalances at least a portion of the weight of the cutting unit on the ground by proportionally shifting varying portions of the weight of the cutting unit from the ground to the traction vehicle with the shifted weight portions lying within a range of weight adjustments in a substantially infinite adjustment manner rather than by adjusting in a manner using only preset incremental weight portions lying in the range; and (ii) an electronic controller operatively connected to the weight transfer mechanism with the controller being responsive to a variable input parameter for substantially continuously and infinitely adjusting the weight transfer mechanism in concert with variation in the input parameter.

19. The mower of claim 18, wherein the input parameter is chosen from a group of parameters consisting of:

(a) a parameter corresponding to a condition of the traction vehicle when the traction vehicle is operating;

(b) a parameter corresponding to an environmental condition of the turf surface; and (c) a parameter comprising an actual, real time location of the traction vehicle on the turf surface that is read against a map that is available to the controller with the map correlating desired adjustment values of the weight transfer mechanism to different geographical locations on the turf surface.

20. The mower of claim 19, wherein the group of parameters additionally comprises:

(a) altitude of the traction vehicle above sea level; and (b) manual input from an operator of the traction vehicle which permits the operator to manually establish a back-pressure.

* * * * *